United States Patent [19]
Fox

[11] Patent Number: 4,754,161
[45] Date of Patent: Jun. 28, 1988

[54] CIRCUIT AND METHOD FOR PARALLELING AC ELECTRICAL POWER SYSTEMS

[75] Inventor: David A. Fox, Shawnee Township, Allen County, Ohio

[73] Assignee: Westinghouse Electric Corp., Pittsburgh, Pa.

[21] Appl. No.: 80,030

[22] Filed: Jul. 31, 1987

[51] Int. Cl.$^4$ ............................................. H02J 1/10
[52] U.S. Cl. ........................................ 307/87; 307/64; 307/66; 307/85
[58] Field of Search ...................... 307/57, 58, 51, 64, 307/66, 85, 86, 87

[56] References Cited

U.S. PATENT DOCUMENTS

| | | |
|---|---|---|
| 2,862,111 | 11/1958 | Richards, Jr. et al. . |
| 3,069,556 | 12/1962 | Apfelbeck et al. . |
| 3,156,828 | 11/1964 | Hopper et al. ........................ 307/57 |
| 3,210,556 | 10/1965 | Billings . |
| 3,294,976 | 12/1966 | Tipton et al. . |
| 3,444,387 | 5/1969 | Billings et al. . |
| 3,539,820 | 11/1970 | Kessler . |
| 3,588,519 | 6/1971 | Luebrecht . |
| 3,683,199 | 8/1972 | Billings et al. ........................ 307/87 |
| 3,906,335 | 9/1975 | Watanabe et al. ................. 307/82 X |
| 4,164,661 | 8/1979 | Hucker et al. ........................ 307/57 |
| 4,177,389 | 12/1979 | Schott ................................ 307/86 X |
| 4,276,590 | 6/1981 | Hansel et al. ...................... 307/82 X |
| 4,510,399 | 4/1985 | Baker . |
| 4,520,275 | 5/1985 | Mrasik ................................... 307/64 |
| 4,694,193 | 9/1987 | Schlenk et al. ................... 307/64 X |

Primary Examiner—William M. Shoop, Jr.
Assistant Examiner—Paul Ip
Attorney, Agent, or Firm—R. P. Lenart

[57] ABSTRACT

A control circuit for controlling the operation of a parallel source electrical power system produces a pair of load current signals representative of the load current delivered by corresponding phases of individual channels of the power system. At least one of the load current signals is scaled by a scaling factor to obtain a scaled load current signal that is combined with the load current signal for the other channel to obtain a feedback signal. The feedback signal is used to control the output of one of the paralleled power sources such that the ratio of load currents delivered by the power sources is proportional to the scaling factor.

14 Claims, 2 Drawing Sheets 4,754,161

CIRCUIT AND METHOD FOR PARALLELING AC ELECTRICAL POWER SYSTEMS

BACKGROUND OF THE INVENTION

This invention relates to control circuits and methods for paralleling AC electrical power systems and, more particularly, to such circuits and methods which are applicable to parallel AC power systems having channels with different power ratings.

AC electric power systems are generally connected in parallel to increase total system rating, or in certain cases such as airborne power systems, to increase reliability. Typical aircraft AC electrical power systems include two or more identical power channels. These channels may include a constant speed generator with a constant speed drive (CSD) for frequency control, or a variable speed generator with a constant frequency electronic inverter (VSCF). To improve reliability and maximize efficiency, it is generally desired that the total system load be divided equally among the paralleled generators. Load division among AC generators is accomplished by controlling, in a closed loop manner, individual generator voltages and phase angles.

Other types of electrical power systems which may be operated with parallel channels include photovoltaic, thermionic, fuel cell, or battery systems with inverter outputs such as used for space applications. All of these systems require active control of both real and reactive power flow between the paralleled channels. Controls for paralleling AC systems have been developed for paralleled AC electrical systems. These controls use currrent transformer loops to sense difference currents between channels. Frequency and voltage controls then drive the difference currents to zero. This type of control system will also work between channels of different power rating if appropriate current transformer ratios are chosen.

Advance electrical AC power systems will require that the generating channels have a programmable power rating. Programmability will be needed to accommodate degraded power sources caused by failed rotating rectifiers in brushless AC generators, reduced cooling capacity, damaged fuel cells, etc.

SUMMARY OF THE INVENTION

This invention provides a circuit and method for paralleling channels of an AC electric power system wherein individual channels have different and/or variable power ratings. Control circuits which perform the method of this invention produce a pair of load current signals which are representative of the load current delivered by two channels of a parallel source electric power system. At least one of these load current signals is scaled by a factor representative of the power rating of one of the power system channels. The scaled load current signal and the other load current signal are combined to produce a feedback signal which is used to modify the operation of one of the paralleled power sources such that the ratio of the load currents delivered by the paralleled power sources is proportional to the scaling factor.

The scaling factor may be varied in accordance with the power rating of one of the individual power sources. It may also be controlled in order to reduce system transients during application or removal of one of the power sources from the system. The load current signals may be produced by current transformers and scaling can be accomplished by multiplying or dividing one of the load current signals by a digital or analog technique. The scaled load current signal and the other load current signal can be easily combined by applying them to opposite ends of a resistive branch circuit.

DESCRIPTION OF THE PREFERRED EMBODIMENTS

Figure 1:
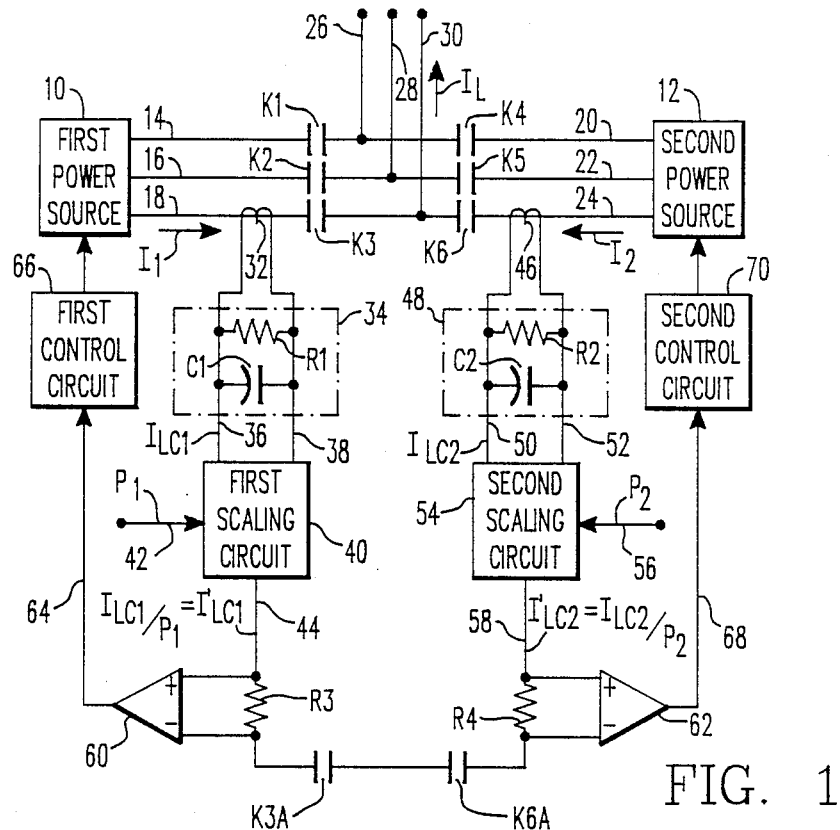
FIG. 1 is a schematic diagram, partially in block diagram form, of a paralleled AC electric power system having a control circuit constructed in accordance with one embodiment of the present invention.

Referring to the drawings, FIG. 1 is a schematic diagram, partially in block diagram form, of a parallel AC electric power system having a control circuit constructed in accordance with the present invention. The system contains first and second power sources 10 and 12, which may be variable frequency, variable voltage power sources such as electronic inverters. The first power source 10 produces a three phase AC output on lines 14, 16 and 18. The second power source 12 produces a three phase output on lines 20, 22 and 24. A plurality of power bus conductors 26, 28 and 30 can be connected to the individual phase conductors of the first and second power sources by way of contacts K1, K2, K3, K4, K5 and K6.

Current transformer 32 is inductively coupled to the phase conductor 18 in one channel of the power system. A burden circuit 34 including resistor R1 and capacitor C1 is connected across the current transformer 32 to produce a voltage signal between lines 36 and 38 which is proportional to current flowing in phase conductor 18. A first scaling circuit 40 applies a scaling factor from line 42 to the first load current signal on lines 36 and 38 to produce a first scaled load current signal on line 44.

A second current transformer 46 is inductively coupled to phase conductor 24 of the second power source. Burden circuit 48 includes resistor R2 and capacitor C2 and is connected across current transformer 46 such that a second voltage signal representative of the load current flowing in conductor 24 is produced on lines 50 and 52. A second scaling circuit 54 applies a second scaling factor received on line 56 to the second load current signal on lines 50 and 52 to produce a second scaled load current signal on line 58.

The first and second scaled load current signals are applied to opposite ends of a branch circuit including resistors R3 and R4 and auxiliary contacts K3A and K6A. The resulting voltages appearing across resistors R3 and R4 serve as first and second feedback signals respectively which are amplified by amplifiers 60 and 62. The amplified feedback signal on line 64 is applied to the first control circuit 66 which modifies the voltage magnitude and phase angle of the outputs of the first power source 10 in accordance with known circuits and techniques, as illustrated in U.S. Pat. No. 4,510,399, which is hereby incorporated by reference. Similarly, the amplified feedback signal on line 68 is used by the second control circuit 70 to modify the voltage magnitude and phase angle of the outputs of the second power source 12.

In operation, load current signal $I_{LC1}$ is proportional to the current $I_1$ flowing in phase conductor 18 and load current signal $I_{LC2}$ is proportional to the current $I_2$ flowing in phase conductor 24. $P_1$ and $P_2$ are scaling factors which are proportional to the power ratings (or desired power contributions) of the first and second power sources respectively. These scaling factors are applied to the load current signals to produce scaled load current signals $I'_{LC1}$ and $I'_{LC2}$, which are the load current signals $I_{LC1}$ and $I_{LC2}$ divided by $P_1$ and $P_2$ respectively.

When the scaled load current signals are applied to resistors R3 and R4 and auxiliary contacts K3A and K6A, the voltages appearing across resistors R3 and R4 are applied to the real and reactive control circuits of each channel. The action of these control circuits is to drive the voltages on resistors R3 and R4 to zero. This is possible only if:

$$I_1/P_1 = I_2/P_2 \quad (1)$$

or $$I_1 = (P_1/P_2)I_2. \quad (2)$$

If scaling factor $P_2$ is constant, the load sharing of the system will be proportional to scaling factor $P_1$. This scaling factor may be either a digital or analog signal.

Figure 2:
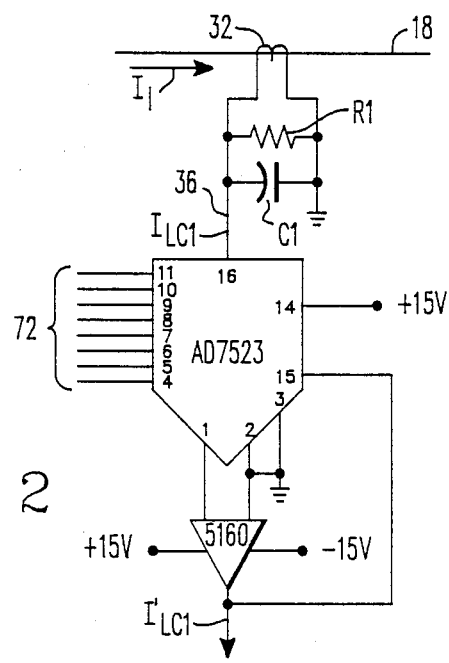
FIG. 2 is a schematic diagram of a portion of the control circuit of the system of FIG. 1.

FIG. 2 is a schematic diagram of a portion of the first channel control circuit of FIG. 1 which uses a digital scaling factor. This digital scaling factor $P_1$ is impressed on data lines 72 of the multiplying digital to analog converter AD7523 which is connected as a divider. The outputs of the multiplying digital to analog converter are applied to an amplifier 5160 to produce the scaled load current signal $I'_{LC1}$ proportional to $I_{LC1}$ divided by $P_1$.

One application of this invention is the reduction in system transients which occur when an unloaded generator is paralleled with a loaded generator. Even if the generators are fully synchronized, there will be a sudden load change on both machines, causing a transient. This transient can be eliminated using the programmable control circuit and method of this invention.

Consider the system of FIG. 1 where the power sources are of equal rating and the generator in the second power source 12 is fully loaded and the scaling factor $P_2 = 1$. Relay contact K1, K2, K3 and K3A are initially open. Scaling factor $P_1$ is initially set to a minimum value of 0.01. Assume that the two power sources are matched exactly in phase and amplitude before paralleling. This can be accomplished with known techniques which are not a part of this invention. When contacts K1, K2, K3 and K3A are closed to parallel the system channels, the generator in power source 10 will pick up only 1% of the load. If scaling factor $P_1$ is slowly increased toward a value of 1.0, the generator in power source 10 will pick up its share of the load as the scaling factor is increased. Since $P_2 = 1$; the load current $I_L$ is the sum of currents $I_1$ and $I_2$; and $I_2$ is equal to $I_1$ divided by scaling factor $P_1$, then:

$$\frac{I_1}{P_1} = I_2. \quad (3)$$

But $I_L = I_1 + I_2 = $ total load $$= I_1\left(1 + \frac{1}{P_1}\right)$$

$$= I_1\left(\frac{P_1 + 1}{P_1}\right)$$

So $I_1 = \left(\frac{P_1}{P_1 + 1}\right)I_L$

Figure 3:
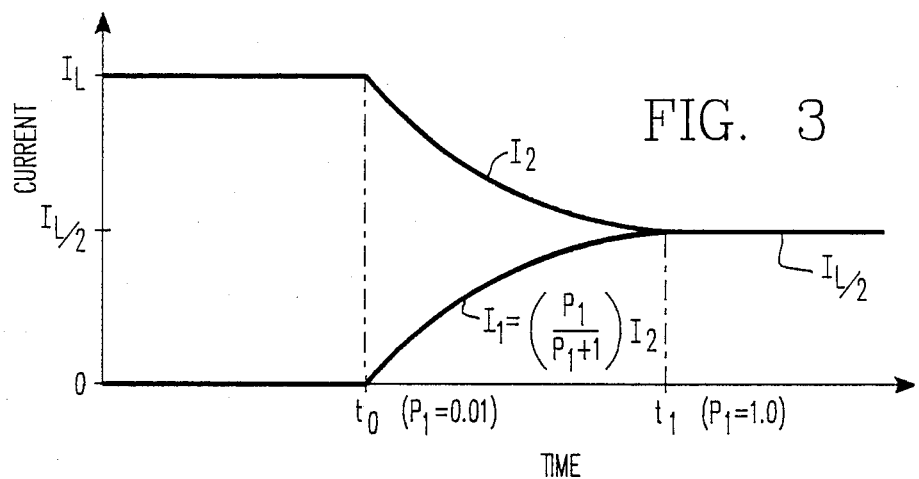
FIG. 3 is a plot of the currents produced in one channel of the circuit of FIGS. 1 and 2.

FIG. 3 is a plot of the currents in one channel of the system of FIG. 1 as the scaling factor $P_1$ is linearly increased from 0.01 to 1.0.

Figure 4:
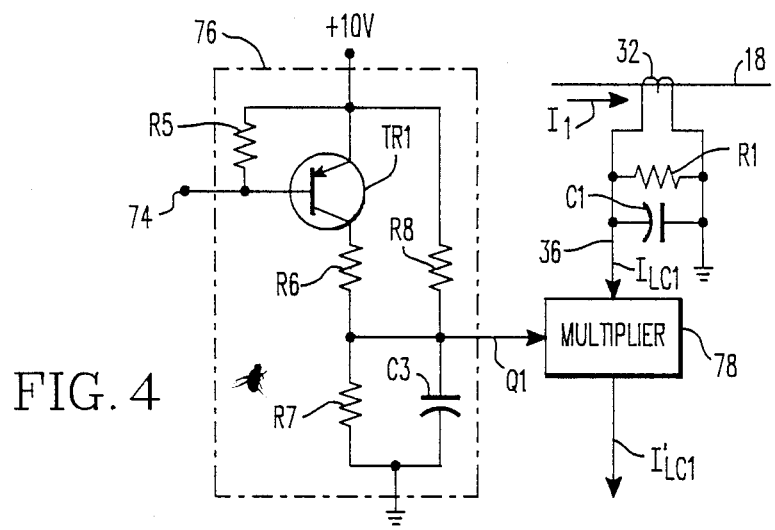
FIG. 4 is a schematic diagram of an alternative circuit which may be used in the control circuit of the system of FIG. 1.

The digital scaling circuit of FIG. 2 can be replaced by a multiplier receiving an analog control signal Q1 as illustrated in FIG. 4. In FIG. 4, an analog scaling signal is applied to terminal 74 and amplified by circuit 76 (comprising transistor TR1, capacitor C3 and resistors R5, R6, R7 and R8) to produce the analog scaling signal Q1. Multiplier 78 multiplies the load current signal $I_{LC1}$ on line 36 by the analog scaling factor Q1 to obtain the scaled load current signal $I'_{LC1}$. For the circuit of FIG. 4, $$Q1 \, I_1 = I_2. \quad (4)$$

But $I_L = I_1 + I_2$ $$= I_1(1 + Q1)$$

So $I_1 = \frac{I_L}{(1 + Q1)}$ with RG = 100Ω, R7 = 10 KΩ, R8 = 1 MΩ and C3 = 10μ fd, and with 10 volts representing a Q1 value of 100, Q1 is a signal of the form:

$$Q1 = 1 + 99e^{-t/0.1 \, sec} \quad (5)$$

as the transistor TR1 is turned off. Then the current in phase conductor 18 becomes:

$$I = \frac{I_L}{2 + 99e^{-t/.1 \, sec}} \quad (6)$$

Figure 5:
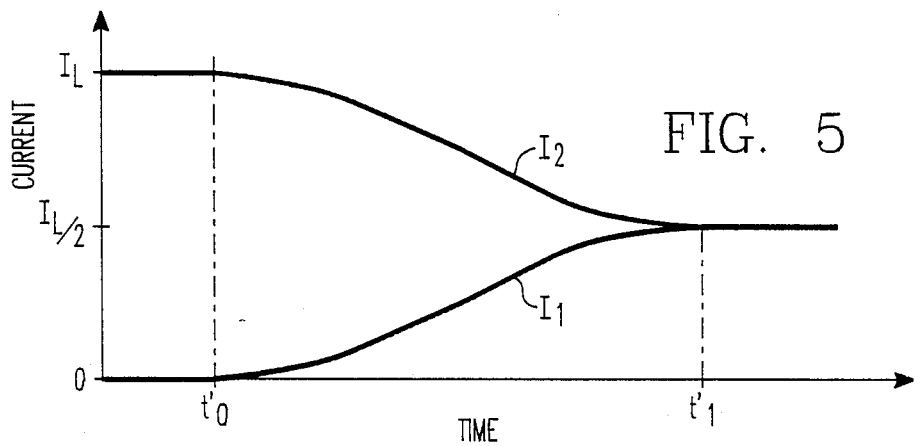
FIG. 5 is a plot of the currents produced in one channel of the system of FIG. 1 using the circuit of FIG. 4.

FIG. 5 shows the currents in one channel of the system of FIG. 1 when the analog scaling circuit of FIG. 4 is used. Note that the current transitions in FIG. 5 are smoother than those in FIG. 3.

Other types of load applications may be obtained by varying the scaling factors. Of course, this invention can be used to eliminate transients as parallel systems are isolated at shutdown or during system configuration changes.

Although the present invention has been described in terms of what are at present believed to be its preferred embodiments, it will be apparent to those skilled in the art that various changes may be made without departing from the scope of the invention. For example, in FIG. 1, one of the power source channels could be uncontrolled. That is, the load current signal $I_{LC2}$ could be applied directly to resistor R3 at an end opposite to the application of the scaled load current signal $I'_{LC1}$. In that case, only the first channel would be adjusted by its control circuits to achieve the desired ratio of output currents between the first and second power sources.

It should now be apparent that the circuit of FIG. 1 performs a method for controlling the operation of a parallel source electrical power system wherein a first load current signal, representative of a load current delivered by at least one phase of a first controlled, variable frequency, variable voltage power source is scaled by a scaling factor representative of the power rating of the first power source to obtain a scaled load current signal. The scaled load current signal is combined with a second load current signal, representative of the load current delivered by a second parallel power source to produce a feedback signal. The operation of the first power source is then modified in response to the feedback signal such that the ratio of the load currents delivered by the first and second power sources is proportional to the scale factor.

It should be further understood that although control circuits are shown on only one phase conductor of the first and second power sources of FIG. 1, identical control circuits can be added to each of the phase conductors to produce a multiplicity of feedback signals which can be used by the power source control circuits in accordance with known technology.

What is claimed is:

1. A method for controlling the operation of a parallel source electrical power system, comprising the steps of:

producing a first load current signal, representative of the load current delivered by a first controllable, variable frequency, variable voltage power source in a parallel source electrical power system;

producing a second load current signal, representative of the load current delivered by a second power source in said parallel source electrical power system;

scaling said first load current signal by a scaling factor representative of the power rating of said first controllable, variable frequency, variable voltage power source, to obtain a scaled first load current signal;

combining said scaled first load current signal with said second load current signal, to obtain a first feedback signal; and modifying the operation of said first controllable, variable frequency, variable voltage power source in response to said feedback signal such that the ratio of the load currents delivered by said first and second power sources is proportional to said scaling factor;

wherein said scaling step includes the step of varying said scaling factor from a first predetermined value to a second predetermined value.

2. A method for controlling the operation of a parallel source electrical power system, comprising the steps of:

producing a first load current signal, representative of the load current delivered by a first controllable, variable frequency, variable voltage power source in a parallel source electrical power system;

producing a second load current signal, representative of the load current delivered by a second power source in said parallel source electrical power system;

scaling said first load current signal by a scaling factor representative of the power rating of said first controllable, variable frequency, variable voltage power source, to obtain a scaled first load current signal;

combining said scaled first load current signal with said second load current signal, to obtain a first feedback signal; and modifying the operation of said first controllable, variable frequency, variable voltage power source in response to said feedback signal such that the ratio of the load currents delivered by said first and second power sources is proportional to said scaling factor;

wherein said scaling factor is a digital signal and said scaling step includes the step of dividing said first load current signal by said digital signal.

3. A method for controlling the operation of a parallel source electrical power system, comprising the steps of:

producing a first load current signal, representative of the load current delivered by a first controllable, variable frequency, variable voltage power source in a parallel source electrical power system;

producing a second load current signal, representative of the load current delivered by a second power source in said parallel source electrical power system;

scaling said first load current signal by a scaling factor representative of the power rating of said first controllable, variable frequency, variable voltage power source, to obtain a scaled first load current signal;

combining said scaled first load current signal with said second load current signal, to obtain a first feedback signal; and modifying the operation of said first controllable, variable frequency, variable voltage power source in response to said feedback signal such that the ratio of the load currents delivered by said first and second power sources is proportional to said scaling factor;

wherein said scaling factor is an analog signal and said scaling step includes the step of multiplying said first load current signal by an analog signal.

4. A method for controlling the operation of a parallel source electrical power system, comprising the steps of:

producing a first load current signal, representative of the load current delivered by a first controllable, variable frequency, variable voltage power source in a parallel source electrical power system;

producing a second load current signal, representative of the load current delivered by a second controllable, variable frequency, variable voltage power source in said parallel source electrical power system;

scaling said first load current signal by a first scaling factor representative of the power rating of said first controllable, variable frequency, variable voltage power source, to obtain a scaled first load current signal;

scaling said second load current signal by a second scaling factor representative of the power rating of said second controllable, variable frequency, variable voltage power source, to obtain a scaled second load current signal;

combining said scaled first load current signal with said scaled second load current signal, to obtain first and second feedback signals; and modifying the operation of said first controllable, variable frequency, variable voltage power source in response to said first feedback signal, and modifying the operation of said second controllable, variable frequency, variable voltage power source in response to said second feedback signal, such that the ratio of the load currents delivered by said first and second controllable, variable frequency, variable voltage power sources is proportional to said first and second scaling factors;

wherein said step of scaling said first load current signal includes the step of varying said first scaling factor from a first predetermined value to a second predetermined value.

5. A method for controlling the operation of a parallel source electrical power system, comprising the steps of:

producing a first load current signal, representative of the load current delivered by a first controllable, variable frequency, variable voltage power source in a parallel source electrical power system;

producing a second load current signal, representative of the load current delivered by a second controllable, variable frequency, variable voltage power source in said parallel source electrical power system;

scaling said first load current signal by a first scaling factor representative of the power rating of said first controllable, variable frequency, variable voltage power source, to obtain a scaled first load current signal;

scaling said second load current signal by a second scaling factor representative of the power rating of said second controllable, variable frequency, variable voltage power source, to obtain a scaled second load current signal;

combining said scaled first load current signal with said scaled second load current signal, to obtain first and second feedback signals; and modifying the operation of said first controllable, variable frequency, variable voltage power source in response to said first feedback signal, and modifying the operation of said second controllable, variable frequency, variable voltage power source in response to said second feedback signal, such that the ratio of the load currents delivered by said first and second controllable, variable frequency, variable voltage power sources is proportional to said first and second scaling factors;

wherein said first scaling factor is a digital signal and said step of scaling said first load current signal includes the step of dividing said first load current signal by said digital signal.

6. A method for controlling the operation of a parallel source electrical power system, comprising the steps of:

produciang a first load current signal, representative of the load current delivered by a first controllable, variable frequency, variable voltage power source in a parallel source electrical power system;

producing a second load current signal, representative of the load current delivered by a second controllable, variable frequency, variable voltage power source in said parallel source electrical power system;

scaling said first load current signal by a first scaling factor representative of the power rating of said first controllable, variable frequency, variable voltage power source, to obtain a scaled first load current signal;

scaling said second load current signal by a second scaling factor representative of the power rating of said second controllable, variable frequency, variable voltage power source, to obtain a scaled second load current signal;

combining said scaled first load current signal with said scaled second load current signal, to obtain first and second feedback signals; and modifying the operation of said first controllable, variable frequency, variable voltage power source in response to said first feedback signal, and modifying the operation of said second controllable, variable frequency, variable voltage power source in response to said second feedbackk signal, such that the ratio of the load currents delivered by said first and second controllable, variable frequency, variable voltage power sources is proportional to said first and second scaling factors;

wherein said first scaling factor is an analog signal and said step of scaling said first load current signal includes the step of multiplying said first load current signal by said analog signal.

7. A circuit for controlling the operation of a parallel source electrical power system, comprising:

means for producing a first load current signal, representative of the load current delivered by a first controllable, variable frequency, variable voltage power source in a parallel source electrical power system;

means for producing a second load current signal, representative of the load current delivered by a second power source in said parallel source electrical power system;

means for scaling said first load current signal by a scaling factor representative of the powr rating of said first controllable, variable frequency, variable voltage power source, to obtain a scaled first load current signal;

means for combining said scaled first load current signal with said second load current signal, to obtain a first feedback signal;

means for modifying the operation of said first controllable, variable frequency, variable voltage power source in response to said feedback signal such that the ratio of the load currents delivered by said first and second power sources is proportional to said scaling factor;

said means for producing a first load current signal, representative of the load current delivered by a first controllable, variable frequency, variable voltage power source in a parallel source electrical power system, including a first current transformer coupled to an output conductor of said first controllable, variable frequency, variable voltage power source;

said means for producing a second load current signal, representative of the load current delivered by a second power source in a parallel source electrical power system, including a second current transformer coupled to an output conductor of said second power source;

said scaling factor is a digital signal and said means for scaling said first load current signal by a scaling factor representative of the power rating of said first controllable, variable frequency, variable voltage power source, to obtain a scaled first load current signal, including a digital dividing circuit for dividing said first load current signal by said digital signal; and said means for combining said scaled first load current signal with said second load current signal, to obtain a first feedback signal including a branch circuit electrically connected between said second current transformer and said digital dividing circuit.

8. A circuit for controlling the operation of a parallel source electrical power system, as recited in claim 7, wherein:

said circuit branch includes a resistor.

9. A circuit for controlling the operation of a parallel source electrical power system, comprising:

means for producing a first load current signal, representative of the load current delivered by a first controllable, variable frequency, variable voltage power source in a parallel source electrical power system;

means for producing a second load current signal, representative of the load current delivered by a second power source in said parallel source electrical power system;

means for scaling said first load current signal by a scaling factor representative of the power rating of said first controllable, variable frequency, variable voltage power source, to obtain a scaled first load current signal;

means for combining said scaled first load current signal with said second load current signal, to obtain a first feedback signal;

means for modifying the operation of said first controllable, variable frequency, variable voltage power source in response to said feedback signal such that the ratio of the load currents delivered by said first and second voltage power sources is proportional to said scaling factor;

said means for producing a first load current signal, representative of the load current delivered by a first controllable, variable frequency, variable voltage power source in a parallel source electrical power system, including a first current transformer coupled to an output conductor of said first controllable, variable frequency, variable voltage power source;

said means for producing a second load current signal, representative of the load current delivered by a second power source in a parallel source electrical power system, including a second current transformer coupled to an output conductor of said second power source;

said scaling factor is an analog signal and said means for scaling said first load current signal by a scaling factor representative of the power rating of said first controllable, variable frequency, variable voltage power source, to obtain a scaled first load current signal, including an analog multiplying circuit for multiplying said first load current signal by said analog signal; and said means for combining said scaled first load current signal with said second load current signal, to obtain a first feedback signal, including a branch circuit electrically connected between said second current transformer and said multiplying circuit.

10. A circuit for controlling the operation of a parallel source electrical power system, as recited in claim 9, wherein:

said branch circuit includes a resistor.

11. A circuit for controlling the operation of a parallel source electrical power system, comprising:

means for producing a first load current signal, representative of the load current delivered by a first controllable, variable frequency, variable voltage power source in a parallel source electrical power system;

means for producing a second load current signal, representative of the load current delivered by a second controllable, variable frequency, variable voltage power source in said parallel source electrical power system;

means for scaling said first load current signal by a first scaling factor representative of the powr rating of said first controllable, variable frequency, variable voltage power source, to obtain a scaled first load current signal;

means for scaling said second load current signal by a second scaling factor representative of the powr rating of said second controllable, variable frequency, variable voltage power source, to obtain a scaled second load current signal;

means for combining said scaled first and second load current signals, to obtain a first feedback signal;

means for modifying the operation of said first controllable, variable frequency, variable voltage power source in response to said feedback signal such that the ratio of the load currents delivered by said first and second controllable, variable frequency, variable voltage power sources is proportional to said first and second scaling factors;

said means for producing a first load current signal, representative of the load current delivered by a first controllable, variable frequency, variable voltage power source in a parallel source electrical power system, including a first current transformer coupled to an output conductor of said first controllable, variable frequency, variable voltage power source;

said means for producing a second load current signal, representative of the load current delivered by a second controllable, variable frequency, variable voltage power source in a parallel source electrical power system, including a second current transformer coupled to an output conductor of said controllable, variable frequency, variable voltage power source;

said first scaling factor is a digital signal and said means for scaling said first load current signal by said first scaling factor representative of the power rating of said first controllable, variable frequency, variable voltage power source, to obtain a scaled first load current signal, including a digital dividing circuit for dividing said first load current signal by said digital signal; and said means for combining said scaled first and second load current signals, to obtain a first feedback signal, including a branch circuit electrically connected between said means for scaling said second load current signal and said dividing circuit.

12. A circuit for controlling the operation of a parallel source electrical power system, as recited in claim 11, wherein:

said circuit branch includes a pair of series connected resistors.

13. A circuit for controlling the operation of a parallel source electrical power system, comprising:

means for producing a first load current signal, representative of the load current delivered by a first controllable, variable frequency, variable voltage power source in a parallel source electrical power system;

means for producing a second load current signal, representative of the load current delivered by a second controllable, variable frequency, variable voltage power source in said parallel source electrical power system;

means for scaling said first load current signal by a first scaling factor representative of the power rating of said first controllable, variable frequency, variable voltage power source, to obtain a scaled first load current signal;

means for scaling said second load current signal by a second scaling factor representative of the power rating of said second controllable, variable frequency, variable voltage power source, to obtain a scaled second load current signal;

means for combining said scaled first and second load current signals, to obtain a first feedback signal;

means for modifying the operation of said first controllable, variable frequency, variable voltage power source in response to said feedback signal such that the ratio of the load currents delivered by said first and second controllable, variable frequency, variable voltage power sources is proportional to said first and second scaling factors;

said means for producing a first load current signal, representative of the load current delivered by a first controllable, variable frequency, variable voltage power source in a parallel source electrical power system, including a first current transformer coupled to an output conductor of said first controllable, variable frequency, variable voltage power source;

said means for producing a second load current signal, representative of the load current delivered by a second controllable, variable frequency, variable voltage power source in a parallel source electrical power system, including a second current transformer coupled to an output conductor of said second controllable, variable frequency, variable voltage power source;

said first scaling factor is an analog signal and said means for scaling said first load current signal by said first scaling factor representative of the power rating of said first controllable, variable frequency, variable voltage power source, to obtain a scaled first load current signal, including an analog multiplying circuit for multiplying said first load current signal by said analog signal; and said means for combining said scaled first and second load current signals, to obtain a first feedback signal, including a branch circuit electrically connected between said means for scaling said second load current signal and said multiplying circuit.

14. A circuit for controlling the operation of a parallel source electrical power system, as recited in claim 13, wherein:

said branch circuit includes a pair of series connected resistors.

* * * * *